United States Patent
Rand (10) Patent No.: US 9,415,646 B1
(45) Date of Patent: Aug. 16, 2016

(54) AUTOMOBILE-TRAILER HITCH THAT ELIMINATES JACK-KNIFING

(71) Applicant: Jacob Sidney Rand, New York, NY (US)

(72) Inventor: Jacob Sidney Rand, New York, NY (US)

( * ) Notice: Subject to any disclaimer, the term of this patent is extended or adjusted under 35 U.S.C. 154(b) by 0 days.

(21) Appl. No.: 14/662,212

(22) Filed: Mar. 18, 2015

(51) Int. Cl.
*B60D 1/167* (2006.01)
*B60D 1/30* (2006.01)
*B60D 1/02* (2006.01)

(52) U.S. Cl.
CPC ... *B60D 1/30* (2013.01); *B60D 1/02* (2013.01)

(58) Field of Classification Search
CPC .................................... B60D 1/30; B60D 1/02
USPC ......................................... 280/515, 507, 514
See application file for complete search history.

(56) References Cited

U.S. PATENT DOCUMENTS

| | | | | | |
|---|---|---|---|---|---|
| 4,552,377 | A | * | 11/1985 | Folkerts | 280/515 |
| 5,775,139 | A | * | 7/1998 | Sellers | B60D 1/60 |
| | | | | | 280/507 |
| 7,273,114 | B1 | * | 9/2007 | Rand | B60D 1/173 |
| | | | | | 180/14.1 |
| 2007/0189846 | A1 | * | 8/2007 | Cocayne | B60D 1/025 |
| | | | | | 403/52 |
| 2011/0101644 | A1 | * | 5/2011 | Schneider | 280/417.1 |
| 2013/0076008 | A1 | * | 3/2013 | Su | B60D 1/54 |
| | | | | | 280/515 |
| 2014/0008894 | A1 | * | 1/2014 | Jarvis | B60D 1/00 |
| | | | | | 280/515 |

* cited by examiner

*Primary Examiner* — Jacob Knutson
(74) *Attorney, Agent, or Firm* — Stanley H. Kremen (57) ABSTRACT

An automobile-RV trailer hitch, the first half of which is securely mounted to the rear underside of the automobile, and the second half of which is securely mounted to the underside of the trailer. When the trailer is attached to the automobile, the two hitch halves interlock. A locking rod is inserted horizontally to cause the hitch to act as a single unit. Horizontal rotation is prevented, but the trailer is able to pivot vertically around the locking rod to compensate for the trailer going over bumps in the road.

6 Claims, 6 Drawing Sheets

PRIOR ART

AUTOMOBILE-TRAILER HITCH THAT ELIMINATES JACK-KNIFING

BACKGROUND OF THE INVENTION

Jack-knifing is often observed on a highway with 18-wheel tractor-trailers. Jack-knifing usually occurs when a truck needs either to make a turn to the right or left or to change lanes, especially on wet or snowy roads. The tractor and the trailer have a common pivot point between them. If the turn is too sharp, the tractor having a tighter turn radius is able to make the turn, but the trailer cannot follow because its turn radius is too great. The result is that the tractor and the trailer wind up at approximately right angles to one another, and neither the tractor nor the trailer is able to move by itself. Jack-knifed tractor-trailer vehicles stalled on roads cause additional accidents and traffic jams. My U.S. Pat. No. 7,273,114 presents a solution to this problem. The solution lies in eliminating the pivot point and making the tractor-trailer into a single unit.

Automobiles have four wheels mounted on two axles. With most automobiles, the front wheels remain parallel to each other, and turning them to the right or left causes the entire vehicle to turn. The rear wheels merely go along for the ride. Small trucks are available where the cab and the storage area for a single non-pivotal unit. These are four wheel or six wheel trucks, where turning the front wheels right or left causes the truck to turn. These trucks cannot jack-knife because there is no pivot point. Both the cab and the storage area act as a single unit.

However, automobiles often tow trailers. These trailers can be small (e.g., half a car-length) or large. Towing is accomplished by securing a hitch to the bottom of the automobile and connecting the trailer to an exposed portion of the hitch. The exposed portion of the automobile hitch is usually a ball shaped pivot point, and it represents the male portion of the automobile-trailer hitch. The trailer also has a mating hitch secured to its bottom, and it represents the female portion of the automobile trailer hitch. The trailer hitch terminates in a cylindrical hole that fits exactly over the ball shaped pivot point of the automobile hitch. This connection allows the automobile and the trailer to rotate around the pivot point. When the automobile turns to the right or left, the trailer follows. Unfortunately, because the automobile and trailer rotate freely around a single point, if the automobile turns too sharply, jack-knifing can occur. Often, jack-knifing may cause the trailer to overturn.

Once again, the solution to the problem of jack-knifing of the trailer lies in elimination of the pivot point. The Present Invention is a hitch that integrates the automobile and trailer into a single non-pivotal unit.

SUMMARY OF THE INVENTION

The Present Invention is a hitch, the first half of which is securely mounted to the underside of the automobile, and the second half of which is securely mounted to the underside of the trailer. When the trailer is attached to the automobile, the two hitch halves interlock. A locking rod is inserted horizontally to cause the hitch to act as a single unit. Horizontal rotation is prevented, but the trailer is able to pivot vertically around the locking rod to compensate for the trailer going over bumps in the road.

DETAILED DESCRIPTION OF THE INVENTION

Figure 1:
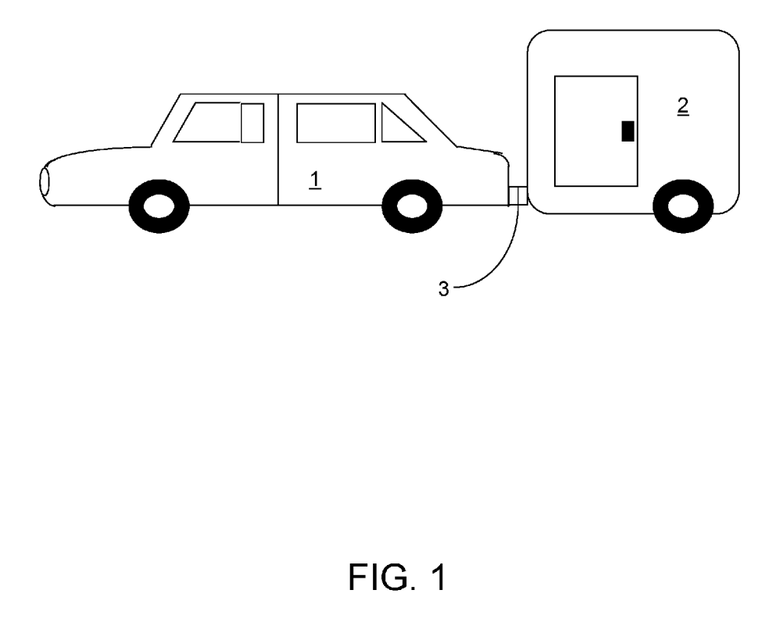
FIG. 1 shows an automobile towing a trailer.

FIG. 1 shows automobile, 1, towing trailer, 2, which is connected to automobile, 1, by hitch 3. Hitch 3 represents the Present Invention. FIGS. 2A through 2D show the hitch disassembled into its two halves, while FIG. 2E shows the locking rod that secures the two halves of the hitch to each other. FIG. 3 shows the hitch fully assembled.

Figure 2A:
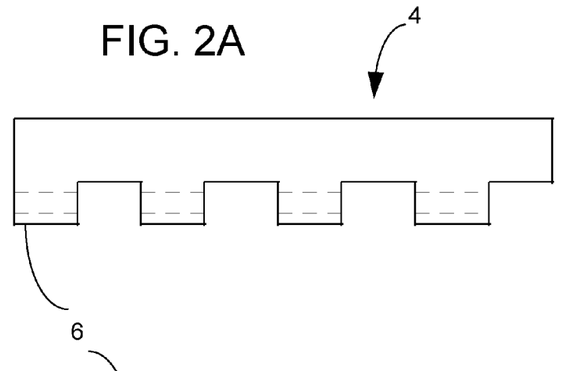
FIGS. 2A & 2C are top plan views of the two halves of the hitch.
Figure 2B:
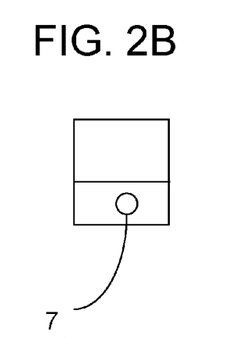
FIGS. 2B & 2D are side elevation views of the two halves of the hitch, corresponding respectively to the views of FIGS. 2A & 2C.
Figure 2C:
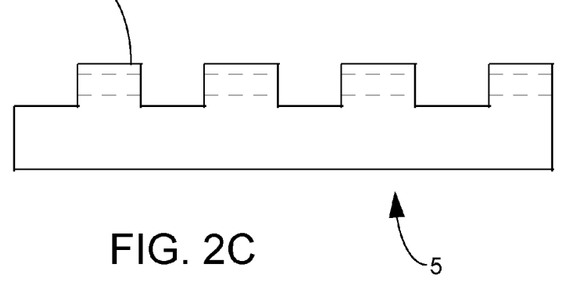
Figure 2D:
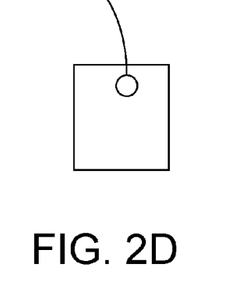
Figure 2E:
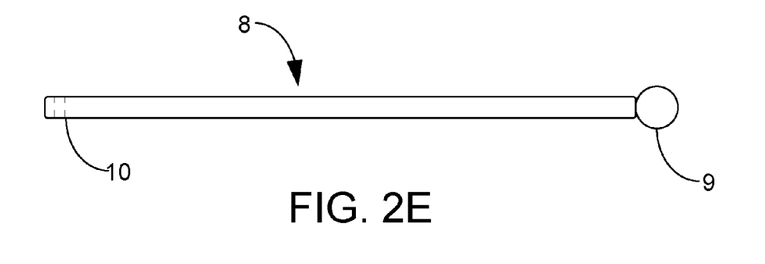
FIG. 2E shows the locking rod.
Figure 3:
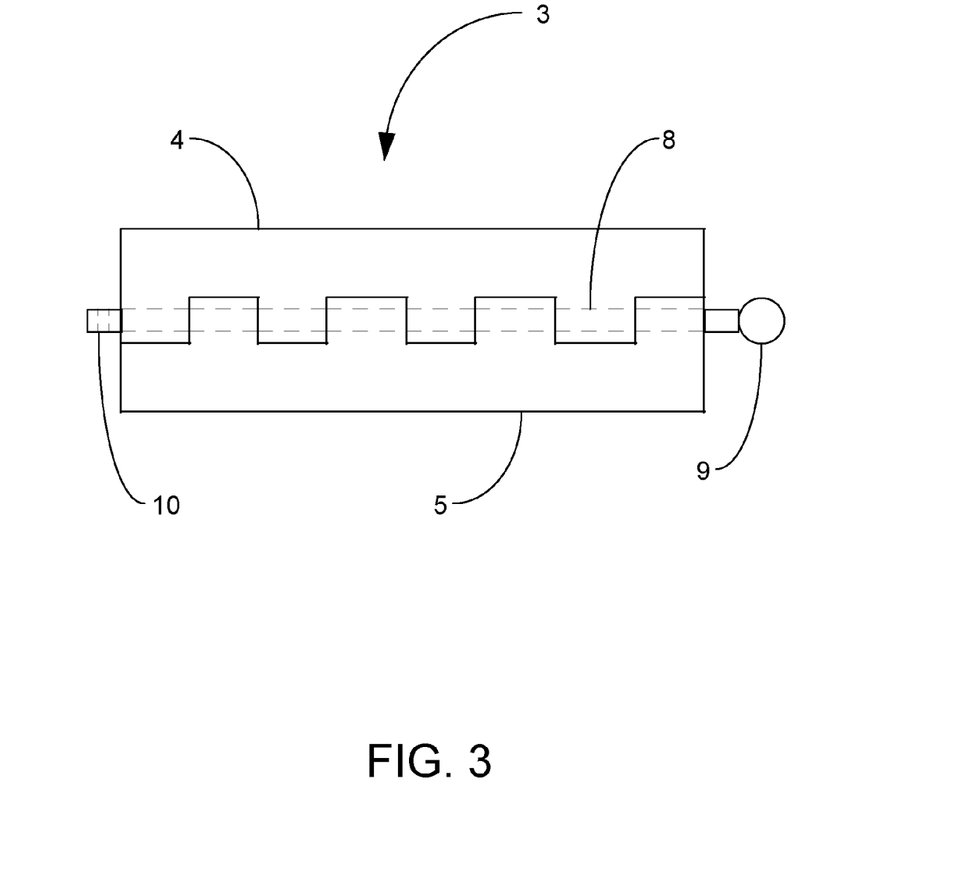
FIG. 3 shows the two hitch halves held together by insertion of the locking rod.

Referring to FIGS. 2A and 2C, elements 4 and 6 are top plan views of the two hitch-halves. One-half is securely mounted to the rear underside of the automobile, while the other half is securely mounted to the underside of the trailer. The two halves have a plurality of protruding elements, 6, that mate together when the two halves are joined. FIG. 2B is a side elevation view of the hitch-half shown in FIG. 2A, while FIG. 2D is a side elevation view of the hitch-half shown in FIG. 2C. A coincident cylindrical hole, 7, is drilled through all of the protrusions, 6. When the two halves are joined together, rod 8 is inserted through all the protrusions. As may be seen in FIG. 2E, locking rod 8 may have a stop, 9, on one end, and a hole, 10, on the other end into which a locking device (such as pin or lock) may be inserted. Many other elements can be configured on the ends of the rod. However, they must be of such a nature that, once the rod is inserted into the cylindrical thru-hole, some element on each end of the rod must lock it into place in the hitch until it is desired that the automobile and trailer be separated. FIG. 3 shows hitch, 3, fully assembled and ready for the automobile to tow the trailer. Half, 4, is brought together with half, 5, and rod, 8, is inserted into thru-hole, 7 (not shown). In this example, knob, 9, holds the locking rod in place on the right side of the hitch, and some locking device is inserted into hole, 10. The combination of the knob and inserted locking device prevents the rod from slipping back out of the cylindrical thru-hole. Although, pivotal motion is prevented in the horizontal direction, some pivotal motion is permitted around rod, 8, in the vertical direction. This is done to relieve stress in the hitch caused by road irregularities.

The hitch of the Present Invention may be used with an ordinary automobile or recreational vehicle towing a trailer. In an ordinary 4-wheeled vehicle, the front wheels turn parallel to the desired turn direction, and the rear wheels go along for the ride. However, when an automobile tows a trailer, there are six wheels touching the road. Where the rear axle of the trailer has four wheels instead of two, eight wheels touch the road. Here, the trailer does not easily follow the turning automobile. During a turn, the rear wheels of the automobile and the trailer wheels will drag sideways along the road surface. This will rapidly wear out the rear automobile tires as well as the trailer tires.

The problem of drag on the rear tires of the automobile and the trailer tires can be eliminated if the automobile has four-wheel steering. The following vehicles are available with four-wheel steering:

| | | |
|---|---|---|
| Accura RLX | Mazda Luce | Porsche 991 |
| Accura TLX | Mazda MX-6 | Chevrolet Silverado |
| Autozam Clef | Mazda RS-7 | Renault Laguna |
| BMW 8 Series (E31) | Mazda Sentia | Subaru Alcyone SVX |
| Efini MS-8 | Mitsubishi Galant | Toyota Camry |
| Honda Accord | Mitsubishi GTO | Toyota Carina ED |
| Honda Ascot | Nissan 180SX | Toyota Celica |
| Honda Ascot Innova | Nissan 300ZX | Toyota Corona ExiV |
| Honda Prelude | Nissan Bluebird | Toyota Crown Majesta |
| Infiniti G | Nissan Cefiro | Toyota Curren |
| Infiniti J30 | Nissan Cima | Toyota Soarer |
| Infiniti M | Nissan Fuga | Toyota Vista |
| Infiniti Q45 | Nissan Skyline | |
| Jeep Hurricane | Nissan Laurel | |
| Lexus GS | Nissan Leopard | |
| | Nissan Serena | |
| | Nissan Silvia | |

Figure 4:
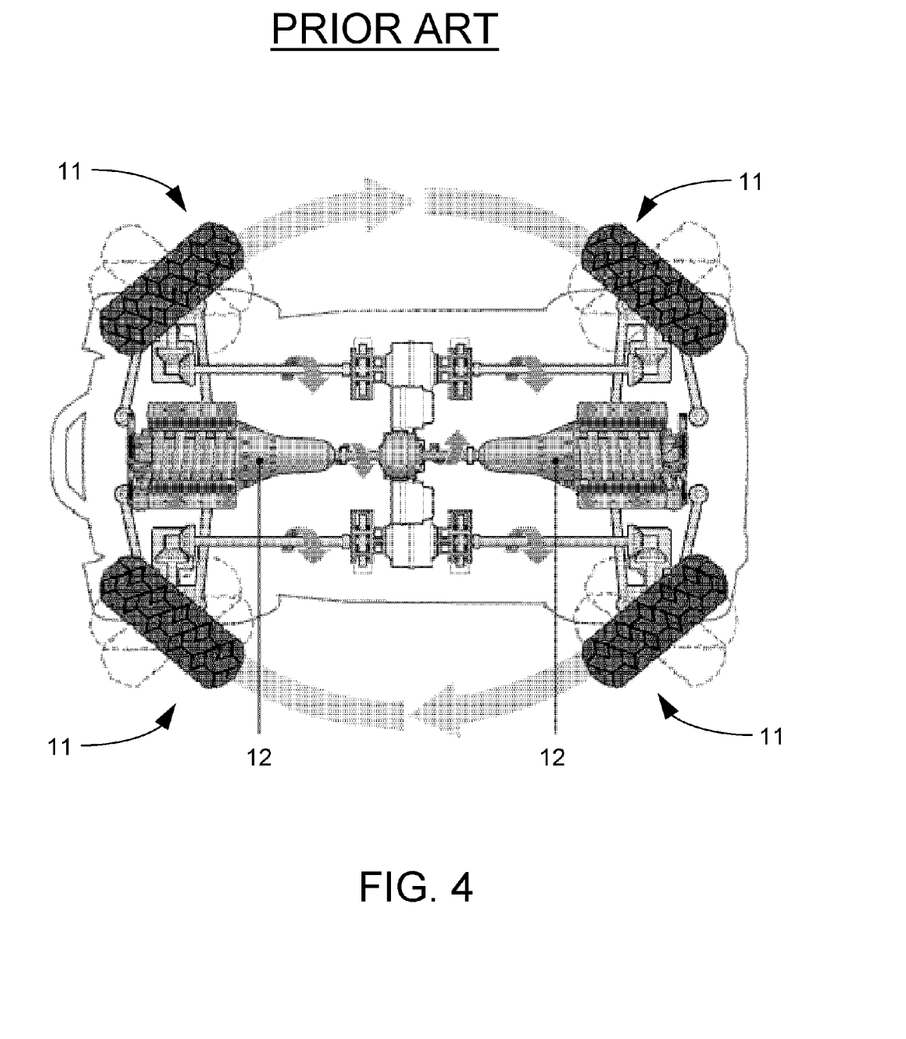
FIG. 4 shows how four-wheel independent steering works in some automobiles.

FIG. 4 is a prior art schematic showing how the four-wheel independent steering works on the Jeep Hurricane. The front and rear wheels, 11, are pivotally mounted on the front and rear axles. Between the front and rear axles are two hemi-engines, 12. These two engines are capable of turning in the same or in opposite directions from each other. The engines are both connected to the two axles by rotating elements. The two axles each have gears at both ends that change directions of the wheels. The rotation direction of each engine determines the direction that the wheels turn. In the drawing, the wheels are "toed-in" toward each other. This will allow the vehicle to rotate around its central vertical axis without horizontal translation. It can actually rotate in place. In other words, it has a turning radius of zero. On the Jeep Hurricane, this is made possible using the "T-Box Zero Steer" mechanism. The Jeep Hurricane mechanism is but an example of four wheel independent steering. Other vehicles may use different mechanisms. However, the ability to turn each wheel independently from every other wheel is common to all such vehicles.

FIGS. 5A through 5E illustrate how wheel positioning influences the direction of travel. In all of these drawings, 13 represents the longitudinal axis of the vehicle. The arrow of element 13 points toward the front of the vehicle.

Figure 5A:
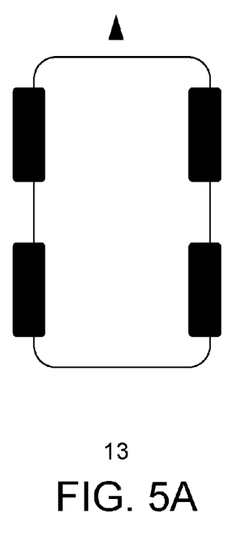
FIG. 5A is a schematic showing the wheel positions in an automobile traveling in a straight line.

In FIG. 5A, all four wheels are parallel to the longitudinal axis. Therefore, in this wheel position, the vehicle can move forward or backward in a direction coincident with the longitudinal axis.

Figure 5B:
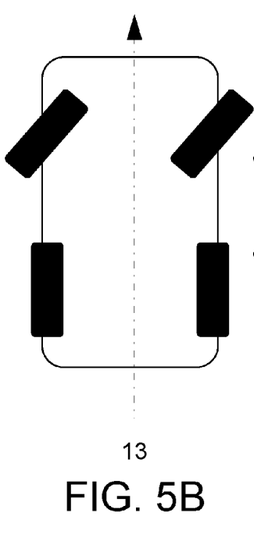
FIG. 5B is a schematic showing the wheel positions in an automobile during a standard front wheel turn.

In FIG. 5B, the front wheels are turned in the same direction and are parallel to each other. The rear wheels remain parallel to the longitudinal axis. This is how all automobiles normally steer. In this case, the vehicle is free to pivot around the midpoint of the rear axle.

Figure 5C:
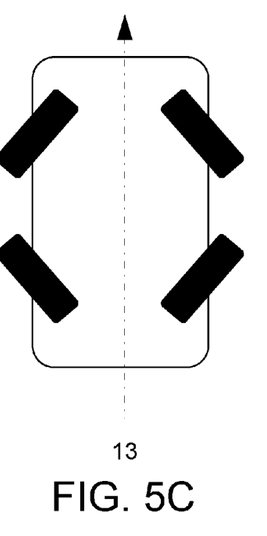
FIG. 5C is a schematic showing the wheel positions in an automobile with four-wheel independent steering where the automobile is able to rotate in place. The wheels "toe-in" to each other.

FIG. 5C illustrates a condition in a vehicle with four wheel independent steering where all wheels are "toed-in" toward each other. This is the steering condition illustrated in FIG. 4. Here, the vehicle is free to pivot in place around a center point defined by the intersecting diagonals drawn from the wheel centers. The vehicle is able to rotate without any other horizontal movement.

Figure 5D:
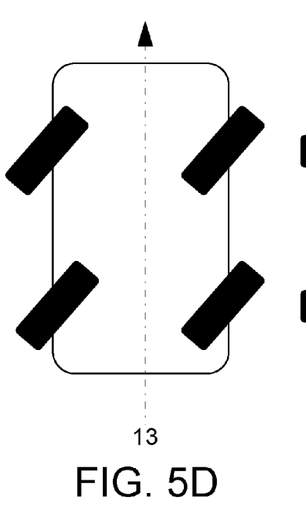
FIG. 5D is a schematic showing the wheel positions in an automobile with four-wheel steering where the automobile does not turn, but moves in a direction parallel to the wheel axis. While all four wheels are parallel to each other, they are not parallel to the longitudinal axis of the vehicle.

FIG. 5D illustrates a condition in a vehicle with four wheel steering where all four wheels turn parallel to each other. Here, the vehicle will experience translational motion rather than rotational motion. There is no pivot point. The vehicle will travel in a direction parallel to the wheels.

Figure 5E:
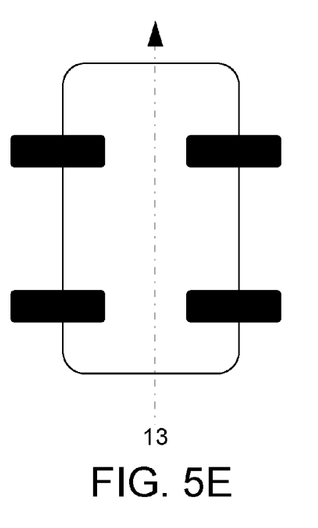
FIG. 5E is a schematic showing the wheel positions in an automobile with four-wheel independent steering where the automobile is able to move sideways in a direction perpendicular to the longitudinal axis of the vehicle. This wheel position can be used to move into and out of tight parking spaces.

Finally, FIG. 5E illustrates a condition in a vehicle with four wheel steering where all wheels turn perpendicular to the longitudinal axis of the vehicle. In this case, the vehicle will move sideways or in a direction perpendicular to the longitudinal axis. This type of positioning is useful for parallel parking.

Returning to the problem discussed above where an automobile is towing a trailer with all six wheels in contact with the road, scuffing of the rear wheels of the automobile and of the trailer can be eliminated if the automobile has four wheel steering and the automobile steers as illustrated in FIG. 5D, where all wheels turn parallel to each other. Here, the automobile itself does not have a pivot point, but merely travels in a direction parallel to the wheels.

Figure 6A:
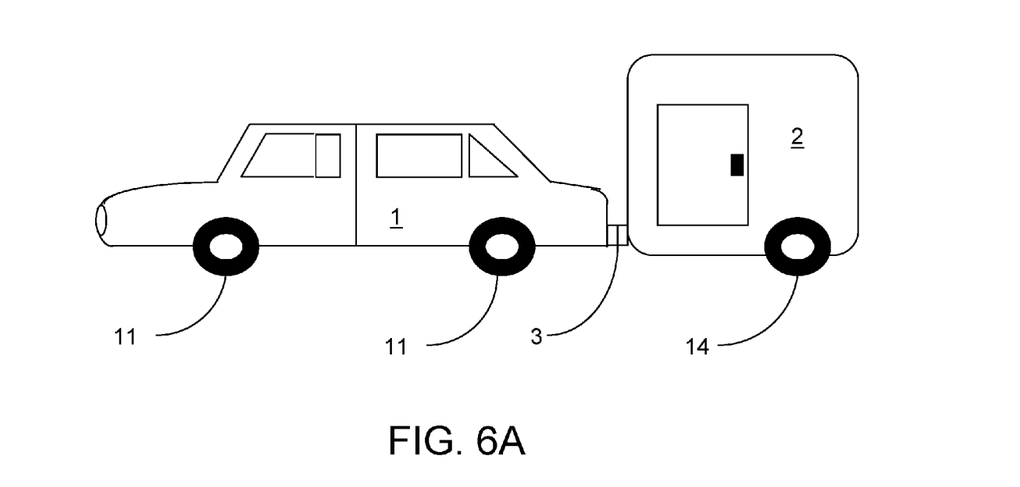
FIG. 6A is a side elevation view of an automobile towing a trailer connected to it by the hitch of the Present Invention. This drawing is identical to FIG. 1.
Figure 6B:
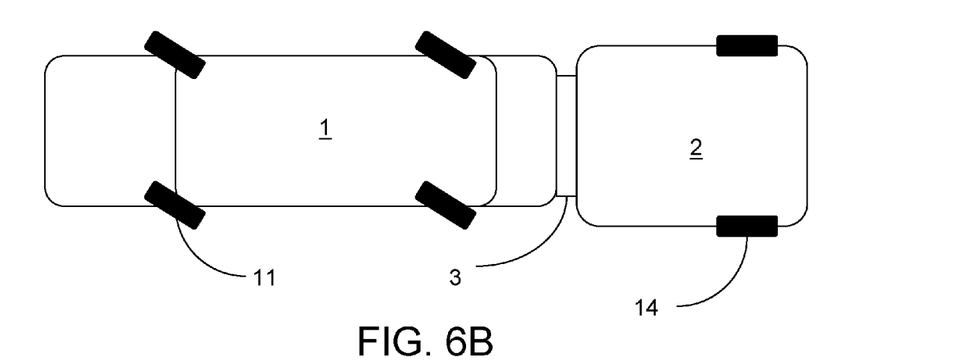
FIG. 6B is a top plan view of the automobile and trailer of FIG. 6A.

FIG. 6A is a side elevation showing automobile, 1, towing trailer, 2, which is attached to the automobile using hitch, 3, i.e., the Present Invention. This drawing is virtually the same as FIG. 1. However, in FIG. 6A, the automobile wheels are represented as elements, 11, and the trailer wheels are represented as elements, 14. There are four wheels, 11, positioned on front and rear wheel axles, and there are two wheels, 14, positioned on a rear axle of the trailer. FIG. 6B is a top plan view of the automobile and trailer of FIG. 6A. Automobile, 1, has four wheel steering. To turn the automobile-trailer combination without scuffing wheels, all four automobile wheels steer in a direction parallel to each other. When towing the trailer, the combination is free to pivot around a point along the center point on the trailer's axle. Steering the automobile in this manner serves the purpose of both converting the automobile-trailer combination into a single integrated vehicle and avoiding wheel scuffing. With this combination, jack-knifing is impossible. FIG. 6B shows the rear axle of the trailer having two wheels. However, the rear axle may also have four wheels.

I claim:
1. A hitch that joins an automobile to a trailer comprising:
 a) a first member, having a length in a horizontal direction and a height in a vertical direction, wherein said first member attaches to the automobile, and wherein said first member comprises:
  i) an element that mounts the first member to the automobile;
  ii) a first solid portion from which a first plurality of protrusions extends,
  iii) wherein each of said first plurality of protrusions is separated by a second plurality of spaces between the protrusions, and,
  iv) wherein a first set of cylindrical holes extend through all of the first plurality of protrusions, such that longitudinal axes of all the first set of cylindrical holes are coincident;

b) a second member, having the same length in the horizontal direction and height in the vertical direction as the first member, wherein said second member attaches to the trailer, and wherein said second member comprises:
  i) an element that mounts the second member to the trailer;
  ii) a second solid portion from which a second plurality of protrusions extends,
  iii) wherein each of said second plurality of protrusions is separated by a first plurality of spaces between the second plurality of protrusions, and
  iv) wherein a second set of cylindrical holes extend through all of the second plurality of protrusions, such that longitudinal axes of the second set of cylindrical holes are coincident;
  such that when the first and second members are brought together so as to mate with each other, the first plurality of protrusions from the first member inserts into the first plurality of spaces from the second member, and the second plurality of protrusions from the second member inserts into the second plurality of spaces from the first member, and
  such that the longitudinal axes of the cylindrical holes passing through the protrusions of the first member coincides with the longitudinal axes of the cylindrical holes passing through the protrusions of the second member;
c) a rod, having a first end and a second end, and a length greater than the length of the first and second members, wherein said rod passes through the cylindrical holes of the first and second members when both members are mated together, said rod further comprising:
  i) a stop on the first end, wherein said stop only allows the rod to be inserted into the cylindrical holes to a desired distance; and
  ii) a receptor on the second end,
  such that when the rod is inserted into the cylindrical holes of the first and second members, the first and second ends extend beyond the lengths of the first and second members;
d) a locking mechanism that attaches to the receptor on the second end of the rod so as to firmly hold the rod in place relative to the mated first and second members, and wherein the rod holds the first and second mated members together;
wherein, when mated together and held in place by the rod, the first and second members pivot around the rod in the vertical direction relative to each other; and said hitch prevents pivotal motion of the trailer relative to the automobile in a horizontal direction.

2. An automobile and trailer combination, comprising the automobile and the trailer, wherein the improvement is that the automobile and trailer are connected to each other by the hitch of claim 1, wherein the first member is securely mounted to the automobile, and the second member is securely mounted to the trailer, such that the automobile and trailer are unable to move relative to each other in the horizontal direction.

3. The automobile and trailer combination of claim 2 wherein the automobile has four wheels and all of the four wheels steer in a same direction such that all of the four wheels are parallel to each other.

4. An automobile and trailer combination comprising:
a) an automobile having four wheels and a longitudinal axis in a horizontal direction;
b) a trailer having wheels and a longitudinal axis in the horizontal direction, wherein said trailer is towed by the automobile; and
c) a hitch inseparably mounted to the automobile and trailer, and connecting the automobile and trailer to each other in such a way as to permanently maintain coincidence of the longitudinal axis of the trailer with the longitudinal axis of the automobile;
wherein the hitch further comprises:
  i) a first member, having a length in the horizontal direction and a height in a vertical direction, wherein said first member attaches to the automobile, and wherein said first member comprises:
    an element that mounts the first member to the automobile;
    a first solid portion from which a first plurality of protrusions extends,
    wherein each of said first plurality of protrusions is separated by a second plurality of spaces between the protrusions, and,
    wherein a first set of cylindrical holes extend through all of the first plurality of protrusions, such that longitudinal axes of all the first set of cylindrical holes are coincident;
  ii) a second member, having the same length in the horizontal direction and height in the vertical direction as the first member, wherein said second member attaches to the trailer, and wherein said second member comprises:
    an element that mounts the second member to the trailer;
    a second solid portion from which a second plurality of protrusions extends,
    wherein each of said second plurality of protrusions is separated by a first plurality of spaces between the second plurality of protrusions, and
    wherein a second set of cylindrical holes extend through all of the second plurality of protrusions, such that longitudinal axes of the second set of cylindrical holes are coincident;
  such that when the first and second members are brought together so as to mate with each other, the first plurality of protrusions from the first member inserts into the first plurality of spaces from the second member, and the second plurality of protrusions from the second member inserts into the second plurality of spaces from the first member, and
  such that the longitudinal axes of the cylindrical holes passing through the protrusions of the first member coincides with the longitudinal axes of the cylindrical holes passing through the protrusions of the second member;
  iii) a rod, having a first end and a second end, ends and a length greater than the length of the first and second members, wherein said rod passes through the cylindrical holes of the first and second members when both members are mated together, said rod further comprising:
    a stop on the first end, wherein said stop only allows the rod to be inserted into the cylindrical holes to a desired distance; and
    a receptor on the second end,
    such that when the rod is inserted into the cylindrical holes of the first and second members, the first and second ends extend beyond the lengths of the first and second members;

iv) a locking mechanism that attaches to the receptor on the second end of the rod so as to firmly hold the rod in place relative to the mated first and second members, and wherein the rod holds the first and second mated members together, such that, when mated together and held in place by the rod, the first and second members pivot around the rod in the vertical direction relative to each other; and whereby when the automobile and trailer combination is in motion, said hitch prevents pivotal motion of the trailer relative to the automobile in the horizontal direction, thereby eliminating the possibility of jack knifing of the trailer relative to the automobile.

5. The automobile and trailer combination of claim 4 wherein all of the four wheels of the automobile steer in a same direction such that all of the four wheels are parallel to each other.

6. The automobile and trailer combination of claim 4 wherein the hitch permits limited vertical movement of the trailer relative to the automobile, wherein the trailer pivots around the hitch only in the vertical direction.

\* \* \* \* \*